June 3, 1969

C. A. MIES 3,447,462

PHOTOELECTRIC ACTUATOR

Filed Feb. 21, 1968

INVENTOR
CLIFFORD A. MIES

BY Thomas J. Nikolai
ATTORNEY

United States Patent Office 3,447,462
Patented June 3, 1969

3,447,462
PHOTOELECTRIC ACTUATOR
Clifford A. Mies, 99 Bedford St. SE.,
Minneapolis, Minn. 55414
Filed Feb. 21, 1968, Ser. No. 707,213
Int. Cl. F42b 23/26
U.S. Cl. 102—8                                    4 Claims

ABSTRACT OF THE DISCLOSURE

A photocell is located at the focus of a parabolic reflector which is formed from a frangible material. The open end of the reflector is mounted on a base containing a power supply, a bridge network and source of illumination. The bridge, which has the photocell in one arm thereof is normally balanced when the photocell is illuminated. When the reflector is crushed by the weight of a person treading on it, the bridge is not balanced and a signal is produced to operate a suitable utilization device.

Background of the invention

This invention relates generally to the field of photocell circuits and apparatus and more specifically to weight operated switching devices for initiating the operation of a utilization device. Various forms of devices are known in the art for detecting the presence of a human or other objects at a given point. For example, in the burglar alarm field, photoelectric cells are arranged to trigger a suitable alarm upon the interruption of a light beam focused on the cell. Similarly, such a system can be used to set off a land mine. The present invention provides a small compact self-contained arrangement of a photoelectric detector, light source and utilization device packaged within a parabolic shaped dome formed from a frangible material which has a reflective surface on the inside surface. The reflective surface normally focuses light from the source onto the photocell. However, when the dome is crushed by an object, the optical system is disturbed and the utilization device actuated.

Figure 1:
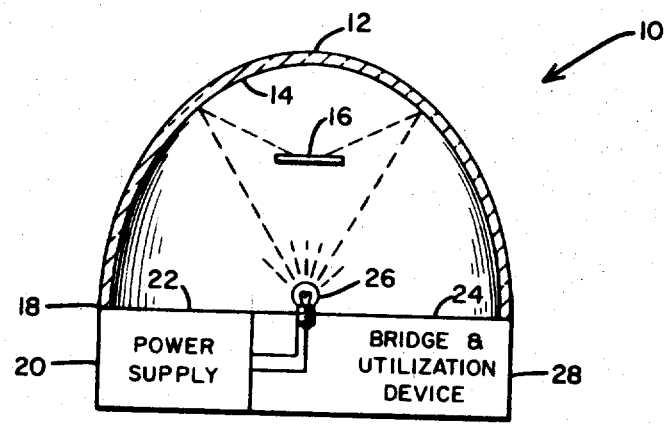
Figure 2:
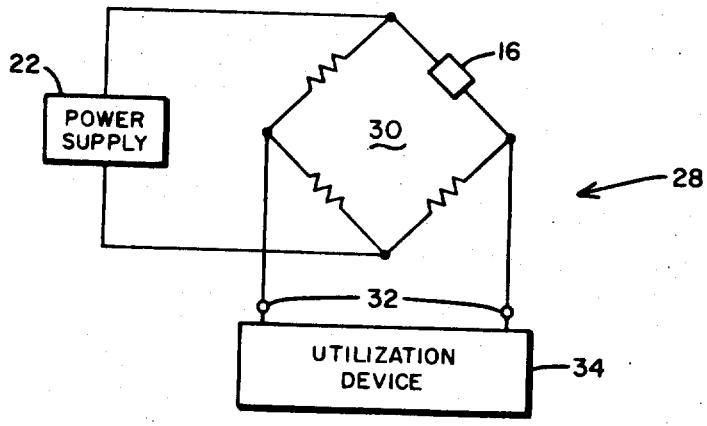

The various features of the invention can best be understood from a reading of the following description in conjunction with the drawings, in which:

FIGURE 1 illustrates by means of a partial cross-sectional view the construction of the preferred embodiment, and FIGURE 2 is a schematic diagram of the electrical circuits which are employed in the apparatus of FIGURE 1.

Referring to FIGURE 1, there is shown generally at 10 the sensing device of this invention. It includes a dome 12 formed from a frangible material such as glass, celluloid, plastic or other suitable material which may be readily crushed.

The dome preferably has a parabolic cross-section and has a reflective or polished inner surface 13. A photocell 16 is mounted at the focal point at the parabolic reflector by any suitable means.

At the open end 18 of the dome 12 is a base member 20 which is a compartment adapted to contain a power supply 22, such as a battery, and also mounted on the upper surface 24 of the base member 20 is a light source 26 connected to the power supply to receive electrical current therefrom. The light from source 26 is normally reflected in the usual fashion onto the photocell 16 positioned at the focus of the parabolic dome 12 and is maintained in a low resistance state.

Also located within the compartment 20 is an electrical Wheatstone bridge circuit and utilization device 28 which is also shown schematically in FIGURE 2. The photocell 16 is connected into one arm of the bridge 30 and the resistance of the remaining arms is such that when the photocell 16 is illuminated, the bridge is balanced so that no signal appears at the imput terminals 32 of the utilization device 34.

In operation, when an object such as a human steps upon the frangible dome 12, the dome is crushed and no longer allows light from source 26 to be reflected onto the photocell 16. This causes the bridge 30 to become unbalanced and as a result, an electrical signal is applied to the input terminals 32 of the utilization device to cause it to operate.

Many applications for such a device exist. For example, the utilization device may constitute an explosive charge set off by an electrical signal so that the package serves as a land mine. Alternatively, the utilization device may comprise an audible alarm triggered by an electrical signal so that the package serves as a burglar alarm.

Many other applications as well as modifications will become apparent to those skilled in the art after reading this specification. Hence, the scope of the invention should be determined by the claims appended hereto.

I claim:
1. A device for initiating the operation of a utilization device when stepped on, comprising in combination:
   a parabolic reflector formed from a frangible material;
   a photoelectric cell located at the focus of said parabolic reflector;
   a base member supporting said parabolic reflector at the open face thereof, said base member housing a light source projecting into said reflector;
   and means connecting said photoelectric cell in electrical circuit with said utilization device, the arrangement being such that light from said source normally is reflected onto said photocell to maintain said utilization in a first state but is no longer reflected onto said photocell when said frangible parabolic reflector is ruptured by the weight of a body stepping thereon to thereby affect the state of said utilization device.
2. Apparatus as in claim 1 wherein said utilization device comprises an electrically triggerable explosive charge.
3. Apparatus as in claim 1 wherein said frangible material is glass.
4. Apparatus as in claim 1 wherein said last mentioned means includes a normally balanced electrical bridge circuit having said photoelectric cell in one arm thereof, with the output terminals of said bridge being connected to said utilization device.

References Cited

UNITED STATES PATENTS

| | | | |
|---|---|---|---|
| 2,137,598 | 11/1938 | Vos | 102—70.2 |
| 2,444,442 | 7/1948 | Herbold | 250—228 X |
| 2,711,133 | 6/1955 | Rines | 102—70.2 |
| 3,131,815 | 5/1964 | Mathias | 356—209 X |

SAMUEL W. ENGLE, *Primary Examiner.*

U.S. Cl. X.R.
102—19.2, 70.2; 250—228